United States Patent
Kolding et al.

(10) Patent No.: US 7,826,851 B2
(45) Date of Patent: Nov. 2, 2010

(54) CHANNEL QUALITY SIGNALING

(75) Inventors: Troels Kolding, Klarup (DK); Frank Frederiksen, Klarup (DK); Olav Tirkkonen, Helsinki (FI)

(73) Assignee: Nokia Corporation, Espoo (FI)

( * ) Notice: Subject to any disclaimer, the term of this patent is extended or adjusted under 35 U.S.C. 154(b) by 740 days.

(21) Appl. No.: 11/717,704

(22) Filed: Mar. 14, 2007

(65) Prior Publication Data
US 2007/0232314 A1      Oct. 4, 2007

(30) Foreign Application Priority Data
Mar. 20, 2006    (FI)    ................... 20065183

(51) Int. Cl.
*H04L 12/403*    (2006.01)
(52) U.S. Cl. .................... 455/450; 455/452.2; 370/334; 370/343; 370/344
(58) Field of Classification Search ........................ None
See application file for complete search history.

(56) References Cited

U.S. PATENT DOCUMENTS

| | | | |
|---|---|---|---|
| 7,471,694 B2 * | 12/2008 | Kent et al. ................. | 370/464 |
| 2002/0119781 A1 | 8/2002 | Li et al. | |
| 2004/0176033 A1 * | 9/2004 | Tamaki et al. ................ | 455/59 |
| 2006/0034244 A1 | 2/2006 | Huang et al. | |
| 2006/0200722 A1 * | 9/2006 | Braun ........................ | 714/748 |
| 2009/0010214 A1 * | 1/2009 | Bui ............................ | 370/329 |
| 2009/0161690 A1 * | 6/2009 | Kent et al. ................... | 370/464 |

FOREIGN PATENT DOCUMENTS

| | | |
|---|---|---|
| EP | 0 753 948 | 1/1997 |
| EP | 1 533 966 | 5/2005 |
| GB | 2 415 870 | 4/2006 |

OTHER PUBLICATIONS

International Search Report, International Application No. PCT/FI2007/050148, Filed Mar. 19, 2007.

* cited by examiner

*Primary Examiner*—Ajit Patel
(74) *Attorney, Agent, or Firm*—Squire, Sanders & Dempsey, LLP

(57) ABSTRACT

A channel quality signaling method and a telecommunication system are provided. The system comprises a base station and one or more user equipment, the base station and the user equipment being configured to communicate with each other using a set of given resources. The system comprises a network element for determining connection information comprising the resources to which the channel quality signaling relates, the user equipment capability, and reference information regarding transmission power used by the base station, a network element for determining connection quality criteria. User equipment is configured to measure a parameter relating to the quality of the received signal from a signal received from a base station, determine an identification of physical connection parameters with which the connection quality criteria may be fulfilled given the determined connection information, and transmit the determined identification to the base station.

20 Claims, 3 Drawing Sheets

CHANNEL QUALITY SIGNALING

FIELD

Figure 1:
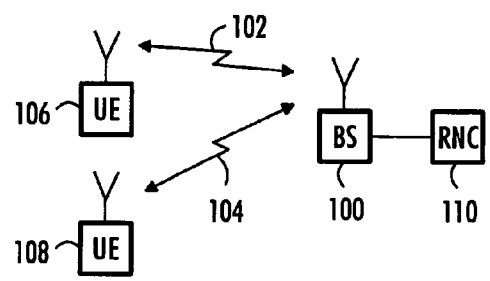

The invention relates to channel quality signaling between a base station and user equipment in a telecommunication system, where the base station and user equipment communicate with each other using a set of given resources.

BACKGROUND

Communication systems, and a wireless communication system in particular, have been under extensive development in recent years. Several new services have been developed in addition to the conventional speech transmission. Different data and multimedia services are attractive to users and communication systems should provide sufficient quality of service at a reasonable cost.

The new developing services require high data rates and spectral efficiency at a reasonable computational complexity. One proposed solution is to use link adaptation techniques, where transmission parameters such as modulation, coding, and/or transmission power are dynamically adapted to the changing channel conditions. Link adaptation is especially useful if the transmitter has some knowledge about channel state prior to transmission.

One access technique where link adaptation may be used is a multicarrier system. Furthermore, multiple antennas may be employed in transmission and reception. In traditional wireless communication systems a connection transmits on a single frequency. In multicarrier systems each connection may use several carriers, which may be called subcarriers. The use of subcarriers can increase data throughput. Both in transmitter and in receiver multiple antennas may be used. The use of multiple antennas provides an efficient diversity solution against fading channels. One such system is a MIMO OFDMA system, which combines MIMO (multiple input multiple output) techniques with OFDM (orthogonal frequency division multiplexing) modulation. In OFDM systems link adaptation and user multiplexing may be performed in the frequency domain.

Information about the channel state may be obtained through the signaling of channel quality indication (CQI) reports. In general, a receiver may measure channel quality from a signal it has received and transmit information based on the measurements to the transmitter. The transmitter may utilize the information when selecting transmission parameters. For example, in systems where a base station is in connection with user equipment, the user equipment may determine channel quality indication and send information reports to the base station. Ideally, these reports reflect the channel quality response with high resolution in both time and frequency domain.

Many proposed channel quality indication methods are based upon the experienced SINR (signal to noise interference ratio) domain behavior since it allows for efficiency scheduling and for interpolating/extrapolating to other operating conditions. However, one problem with SINR based channel quality measurements is that the results are not consistent with different user equipment. The relation of SINR to throughput and other system and link level parameters depends on the user equipment hardware, such as decoder complexity, for example. Therefore, different user equipment may behave differently in similar conditions.

One basic problem is that effective and popular channel quality indication methods for especially frequency domain packet scheduling require high resolution in differentiating between resource blocks (e.g. frequency chunks available for scheduling) of different quality. SINR based and other equivalent methods do however cause some inconsistency problems since there is not a consistent understanding for SINR.

This is a problem especially when user equipment is tested whether they comply with the given regulations. A suitable channel quality indication determination method must be consistent and testable which is not the case for e.g. SINR-based assumptions.

BRIEF DESCRIPTION OF THE INVENTION

An object of the invention is to provide an improved solution for channel quality indication determination. According to an aspect of the invention, there is provided a channel quality signaling method between a base station and user equipment in a telecommunication system, where the base station and user equipment communicate with each other using a set of given resources, the method comprising: determining connection information comprising the resources to which the channel quality signaling relates, the user equipment capability, and reference information regarding transmission power used by the base station, determining connection quality criteria, measuring, in user equipment, from the signal received from the base station, a parameter relating to the quality of the received signal, determining, in the user equipment, an identification of physical connection parameters with which the connection quality criteria may be fulfilled given the determined connection information, and transmitting by the user equipment the determined identification to the base station.

According to another aspect of the invention, there is provided A channel quality signaling method between a base station and user equipment in a telecommunication system, where the base station and user equipment communicate with each other using a set of given resource blocks, the method comprising: determining connection information comprising the resources to which the channel quality signaling relates, the user equipment capability, and reference information regarding transmission power used by the base station, determining connection quality criteria, measuring, in user equipment, from the signal received from the base station, a parameter relating to the quality of the received signal, dividing the available resource blocks into groups on the basis of measured parameter relating to the quality of the received signal, validating the parameter measurement by utilizing the determined connection quality criteria, determining, in the user equipment, an identification of physical connection parameters with which the connection quality criteria may be fulfilled given the determined connection information, and transmitting by the user equipment the determined identification to the base station.

According to another aspect of the invention, there is provided a telecommunication system comprising at least a base station and one or more user equipment, the base station and the user equipment being configured to communicate with each other using a set of given resources, the system comprising: a network element for determining connection information comprising the resources to which the channel quality signaling relates, the user equipment capability, and reference information regarding transmission power used by the base station, a network element for determining connection quality criteria, the user equipment being configured to measure a parameter relating to the quality of the received signal from a signal received from a base station, determine an identification of physical connection parameters with which the connection quality criteria may be fulfilled given the determined connection information, and transmit the determined identification to the base station.

According to another aspect of the invention, there is provided user equipment of a telecommunication system, the user equipment comprising: a transceiver configured to be in communication with a base station of the telecommunication system using a set of given resources, a memory for storing determined connection information comprising the resources to which the channel quality signaling relates, the user equipment capability, and reference information regarding transmission power used by the base station, a memory for storing determined connection quality criteria, measuring unit configured to measure a parameter relating to the quality of the received signal from a signal received from a base station, a controller configured to determine an identification of physical connection parameters with which the connection quality criteria may be fulfilled given the determined connection information, and transmit using the transceiver the determined identification to the base station.

According to yet another aspect of the invention, there is provided a computer program distribution medium readable by a computer and encoding a computer program of instructions for executing a computer process for channel quality signaling method between a base station and user equipment in a telecommunication system, where the base station and user equipment communicate with each other using a set of given resources, the process comprising: storing connection information comprising the resources to which the channel quality signaling relates, the user equipment capability, and reference information regarding transmission power used by the base station, storing determined connection quality criteria, measuring a parameter relating to the quality of the received signal from a signal received from a base station, and determining an identification of physical connection parameters with which the connection quality criteria may be fulfilled given the determined connection information, and transmitting the determined identification to the base station.

The embodiments of the invention encompass a method to represent the time and frequency domain radio channel performance in a way which is testable and consistent. The proposed solution is suitable especially for 3GPP RAN4 purposes, but it may be applied to many systems and different environments. The invention proposes a transformation from the desired per-resource-block domain representation into a suitable representation for transmission and testing.

The invention provides several advantages. Channel quality indication determination performed according to embodiments of the invention defines a solution which is not dependent on user equipment properties or hardware.

The solution can be applied both in single carrier and in multicarrier systems such as OFDM.

LIST OF DRAWINGS

Figure 2:
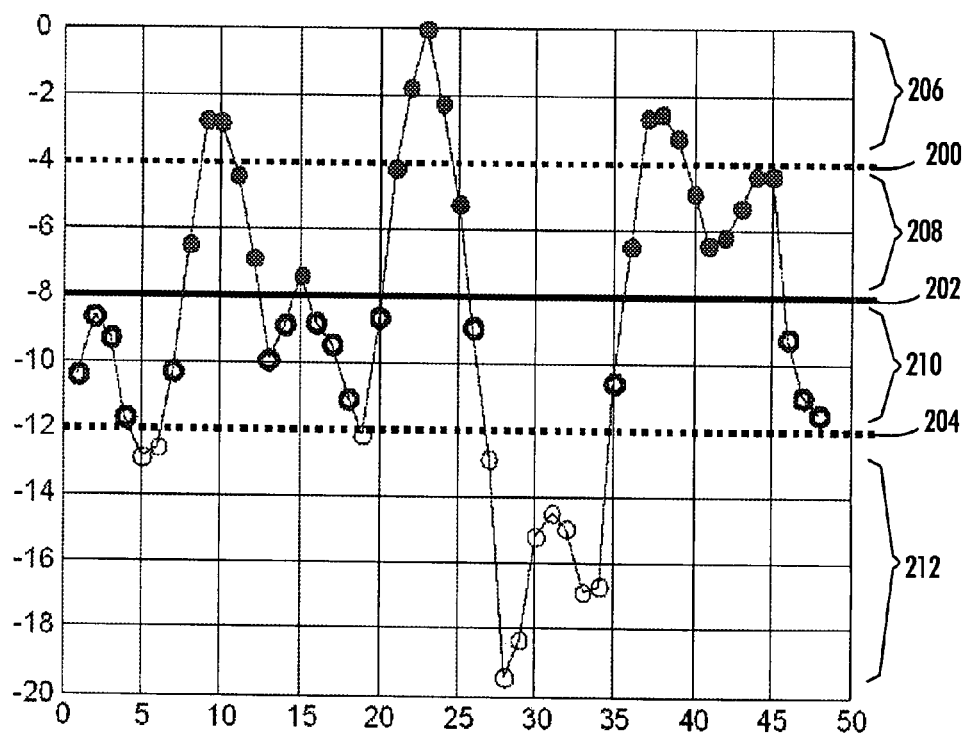
Figure 3:
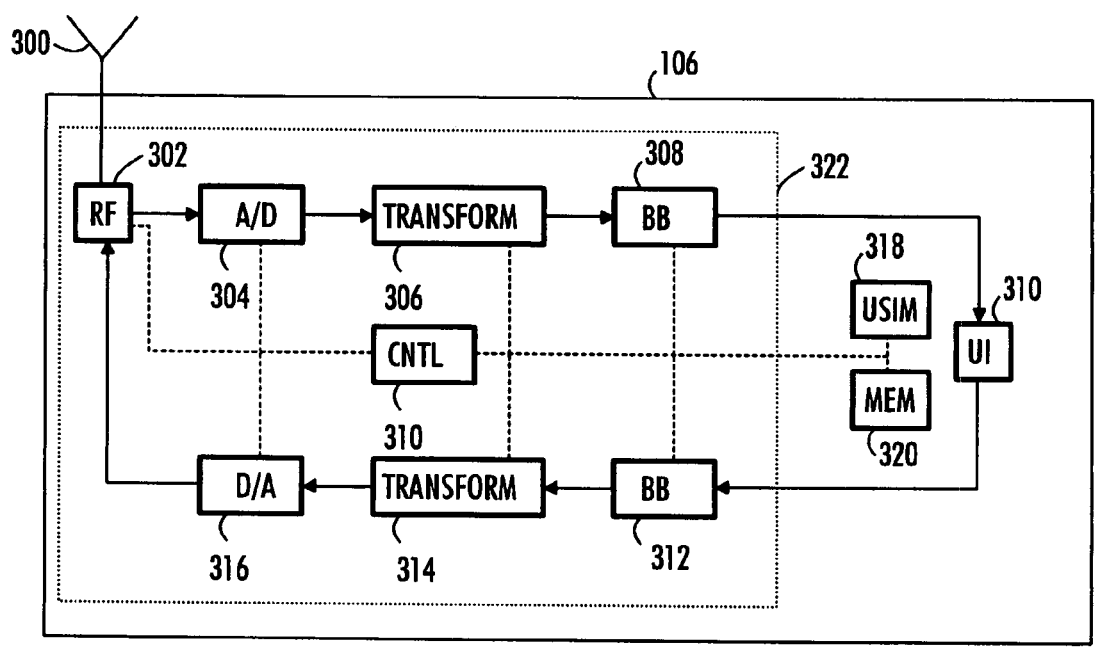
Figure 4:
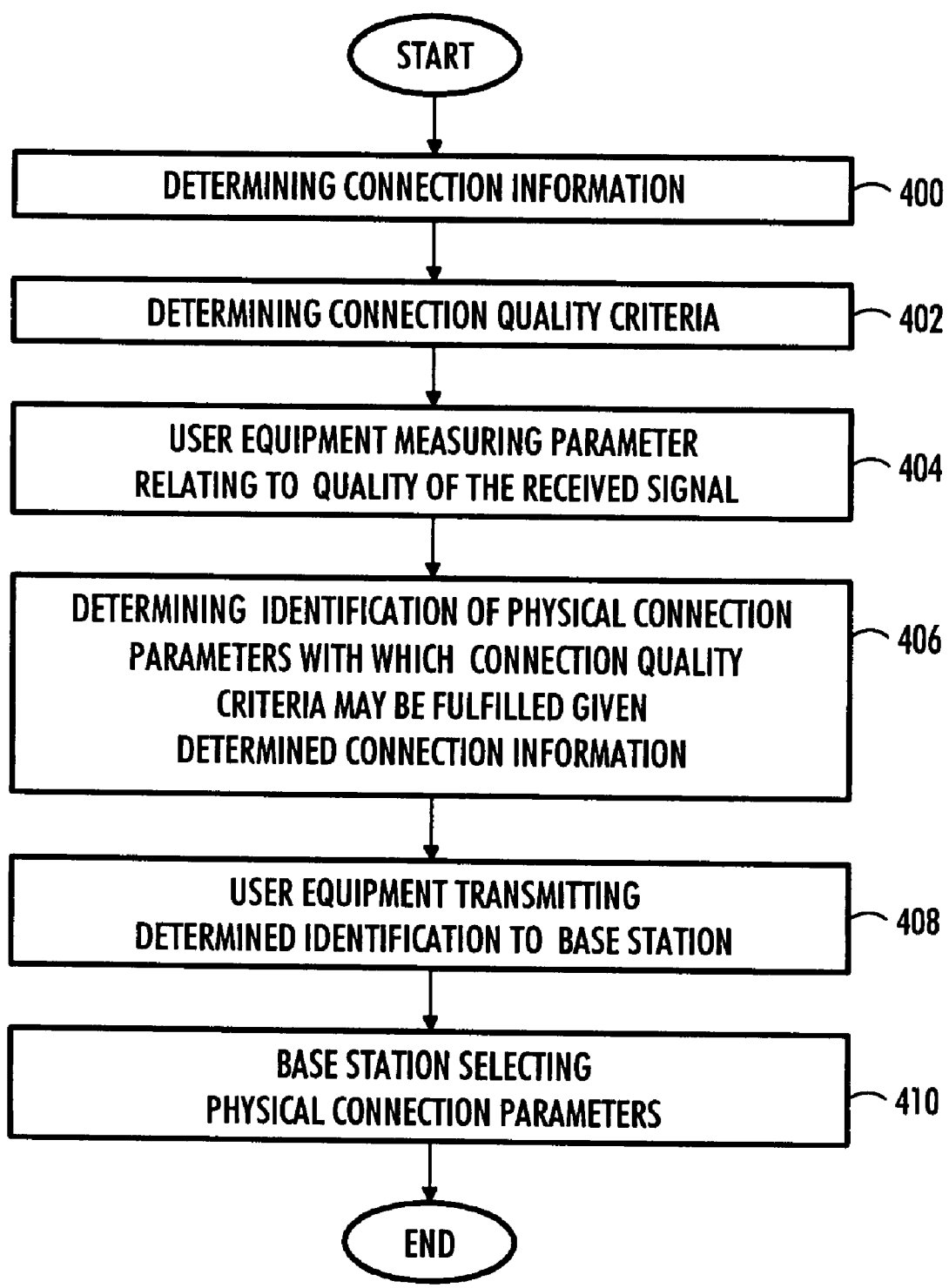

In the following, the invention will be described in greater detail with reference to the embodiments and the accompanying drawings, in which FIG. 1 shows an example of a communication system, FIG. 2 illustrates en embodiment of channel quality determination, FIG. 3 illustrates an example of the structure of user equipment and FIG. 4 is a flowchart illustrating an embodiment of the invention.

DESCRIPTION OF EMBODIMENTS

Embodiments of the present invention are applicable in various telecommunication systems. For example, embodiments of the invention may be applicable in cellular systems in which terminals are provided with different radio path properties. Typical examples of a system in which the invention can be applied are evolutions of third generation systems UMTS.

FIG. 1 is a simplified illustration of a digital data communication system to which an embodiment according to the invention is applicable. This is a part of a cellular radio system, which comprises a base station or an equivalent network element 100, which has bi-directional radio links 102 and 104 to user equipment 106 and 108. The user equipment may be fixed, vehicle-mounted or portable. The base station comprises transceivers which are able to establish the bi-directional radio links to the user equipment. The base station is further connected to a radio network controller or an equivalent network element 110, which transmits the connections of the transceivers to the other parts of the network. The radio network controller controls in a centralized manner several base stations connected to it.

The radio system can also communicate with other networks such as a public switched telephone network or the Internet.

The base stations may transmit a signal to user equipment using given resources and given transmission parameters. In systems employing link adaptation and user multiplexing the resources and transmission parameters may be dynamically varied on the basis of channel quality indication reports sent by the user equipment. In general, the channel quality indication report comprises information about the channel quality, and a suggestion about transmission parameters with which the user equipment assumes a given transmission quality can be achieved. The base station may transmit a pilot signal or known pilot symbols with a predefined transmission power. The pilot signal and/or the pilot symbols may be utilized in the determination of channel quality. The exact methods used to measure channel quality are not relevant regarding the embodiments of the invention. The measurements may be performed using methods known by one skilled in the art.

In an embodiment of the invention, following framework is applied to channel quality indication determination. First, the base station and user equipment are configured to store common connection information which is either pre-determined or signaled between the base station and user equipment. This connection information or conditions may comprise information on what resource blocks are specified, what power is assumed, puncturing methodology to use associated with forward error correction and what is the user equipment capability, for example. The user equipment capability refers to transmission parameters (such as modulation methods) the user equipment supports. The transmission parameters depend on the system. They may be may be modulation methods or maximum supported bandwidth or instantaneous data rate supported by the user equipment. The common connection information may be a system parameter or it may be determined in the base station, base station controller or other network element of the telecommunication system. In this context, the definition of network element includes user equipment.

Second, the base station and user equipment are configured to store connection quality criteria information or test requirement which is either pre-determined or signaled between the base station and user equipment. The connection quality criteria or test requirement comprises a measure of a quality of the connection between the base station and the user equipment. The connection quality may be determined prior to a communication session between the base station and the user equipment or it may be a predefined system parameter. In an embodiment, the base station determines and transmits the connection quality criteria to the user equipment. In an embodiment, the user equipment determines and transmits the connection quality criteria to the base station, thus making a commitment to a given quality. The connection quality criteria may also be determined in other network element of the telecommunication system.

Third, the channel quality indication report comprises an identification of physical connection parameters with which the connection quality criteria may be fulfilled given the connection information. The identification may comprise information about modulation, encoding, allocated resources and MIMO setting, for example.

Let us study an example of a channel quality indication determination where the above framework is applied. The proposed solution for channel quality indication may be applied to a system employing an orthogonal frequency division multiplexing (OFDM) data transmission scheme.

In the system, the base station may allocate resources to user equipment in time and in frequency domain. In time domain, the base station schedules the users to transmit or receive data at different time intervals. The utilization of OFDM in packet data transmission enables the scheduling to be carried out also in the frequency domain. This means that, at a given time instant, a total frequency band of an OFDM signal is divided into a plurality of frequency blocks (sometimes referred to as resource blocks) and the frequency blocks are scheduled to user equipment for data transmission. Each frequency block may be allocated to a different user or multiple frequency blocks may be allocated to some users depending on the radio channel conditions and load in the network. As is commonly known, an OFDM signal consists of a plurality of subcarriers and each subcarrier carries a symbol during an OFDM symbol interval. A frequency block may comprise a plurality, even dozens, of subcarriers. The base station allocates the frequency blocks to the user equipment receiving a high-speed packet data service on the basis of channel quality indications (CQIs) received repeatedly from the user equipment. The user equipment transmit CQIs with a sufficiently small time interval between successive CQIs so that the base station is constantly aware of channel conditions of user equipment receiving the high-speed packet data service. For some implementations of the CQI signaling, the mobile unit's transmission of the CQI values can be such that CQIs are only transmitted on a need basis, such that certain triggers can allow the mobile station to disrupt the transmission of the CQIs For the calculation of CQI, the base station may transmit a pilot signal continuously on a common pilot channel with a given transmit power level. Since the telecommunication system utilizes OFDM multicarrier data transmission for the high-speed packet data service, the base station may transmit the pilot signal as an OFDM multicarrier signal covering a frequency range utilized for the high-speed packet data service. The pilot signal does not have to be transmitted on every subcarrier of the OFDM multicarrier signal and, thus, it suffices that the pilot signal is transmitted on given subcarriers having frequency separation that enables determination of frequencies suffering from fading. The frequency range may be divided into frequency blocks with each frequency block comprising a plurality of subcarriers, as described above. The pilot signal may be transmitted on one or more subcarriers of each frequency block.

The user equipment may have knowledge of the transmit power level the base station uses for the pilot signal. User equipment receiving the pilot signal may calculate a parameter related to the channel quality from the received pilot signal for each of the frequency blocks. The user equipment may also be configured to calculate the parameter (channel quality metric) for a portion of the frequency blocks but let us now assume that the user equipment calculate the channel quality metric for every frequency block. The parameter or channel quality metric may be signal-to-interference-plus-noise-power ratio (SINR), for example. Instead of SINR, other metrics may be used as the channel quality metric. The channel quality metrics, e.g. SINRs, may be calculated for each frequency block according to an algorithm known in the art by utilizing the pilot signal on the frequency block the channel quality metric is calculated for. Also data aided channel quality estimation methods may be used.

FIG. 2 illustrates the channel quality indication determination. FIG. 2 shows a graph where resource blocks are on the x-axis and relative SINR measurements of the resource blocks are on the y-axis.

The relative SINR levels per resource block are divided with three thresholds 200, 202, 204 into four levels. The levels may be denoted as not usable, bad, fair and good. The threshold levels may be 4 dB, 8 dB and 12 dB, for example. Thus, after channel quality indication transmission the base station knows which resource blocks 206 are within 4 dB from the best resource blocks (above the threshold 200), which resource blocks 208 are within 4-8 dB from the best resource blocks (between the thresholds 200 and 202), which resource blocks 210 are within 8-12 dB (between the thresholds 202 and 204), and finally which resource blocks 212 are more than 12 dB worse than the best resource blocks SINR (below threshold 204). As mentioned, the SINR itself is very hard to test as SINR interpretation depends on the UE implementation and is thus not specific.

Applying the above mentioned framework the predetermined or signaled common connection information includes physical resource reference point such as available power compared to pilot signal. In addition, common connection information includes information about the resource blocks which are considered when applying test requirement. Rather than assuming all resource blocks (not useful to optimize scheduling), the defined thresholds may be utilized when determining which resource block to utilize. For example, it may be determined that the physical configuration transmitted to the base station relates to only best resource blocks 206, and/or the second best resource blocks 208, for example. The determined resource blocks may be any combination or several conditions may be applied (e.g. specific reports for best resource blocks 206 and for the second best group of blocks 208, for instance).

The identification of physical connection parameters may comprise specification/indication of essential parameters for the system. This may include modulation, coding, MIMO scheme, etc.

The quality criteria information or test requirement may be defined in terms of block error probability (BLEP) or block error rate (BLER). For example, it may be determined that the UE needs to specify a physical configuration that fulfils a 1% BLEP using the best resource blocks 206 only and a 10% BLEP using the best 206 and second best 208 resource blocks together. This would not cause additional signaling. The user equipment could specify a physical configuration supporting 10% BLEP for the best resource blocks 206 and another one with same BLEP target for the second best 208 resource blocks. This could be continued to define all resource block regions but should only be done to the extent that it has a value to the user equipment/network performance.

Many separate implementations are possible with the general idea being that the resource blocks are divided into groups (based on their SINR value which can be arbitrary). A specific test or criteria is used to validate the channel quality indication.

FIG. 3 illustrates a simplified example of the structure of user equipment 106 used in a telecommunication system employing OFDM. The user equipment comprises a transceiver 322. The transceiver is configured to be in communication with a base station of the system using a set of given resources. The transceiver comprises an antenna 300, which receives a signal transmitted by a base station. The received signal is filtered and amplified in an RF block 302 and converted into a digital form in an A/D converter 304. The signal is further taken to a transformer 306 where the received signal is converted into frequency domain. The number of signals in the output of the transformer 306 equals the number of used ODFM subcarriers. The signals are taken to base band parts 308 of the transceiver and further to user interface parts 310 of the user equipment 106. The user interface parts 310 may comprise a display, a microphone, a speaker and keyboard, for example.

On the transmitter side of the transceiver, the signal to be transmitted is taken from base band parts 312 to a transformer 314 where the signal is converted into time domain. From the transformer, the signal is taken to a D/A converter 316 where the signal is converted to analog form, taken to the RF block 302 to be amplified, filtered and transmitted using the antenna 300. The user equipment may further comprise a UMTS subscriber identity module (USIM) 318. The USIM comprises user-related information and information related to information security, such as an encryption algorithm.

The user equipment may further include a controller 310, a memory 320, and computer programs for executing computer processes. The memory may be configured to store determined connection information comprising the resources to which the channel quality signaling relates, the user equipment capability, and reference information regarding transmission power used by the base station. Furthermore, the memory may store the determined connection quality criteria or test requirement.

The controller 310 controls the operation of the user equipment and it may be configured to measure a parameter relating to the quality of the received signal from a signal received from a base station. The controller may be further configured to determine an identification of physical connection parameters with which the connection quality criteria may be fulfilled given the determined connection information, and transmit the determined identification to the base station using the transmitter side of the transceiver.

Next, an embodiment of the channel quality indication determination is described with reference to the flow diagram of FIG. 4. In step 400, connection information comprising the resources to which the channel quality signaling relates, the user equipment capability, and reference information regarding transmission power used by the base station is determined. The information may be either pre-determined or signaled between the base station and user equipment.

In step 402, connection quality criteria or test requirement is determined. The information may be either pre-determined or signaled between the base station and user equipment.

In step 404, user equipment measures from the signal received from the base station a parameter relating to the quality of the received signal.

In step 406, the user equipment determines an identification of physical connection parameters with which the connection quality criteria may be fulfilled given the determined connection information. The parameter measurement is validated by utilizing the determined connection criteria.

In step 408, the user equipment transmits the determined identification to the base station.

In step 410, the base station selects physical connection parameters to be used by the base station when transmitting a signal to the user equipment on the basis of information transmitted by the user equipment.

The embodiments of the invention may be implemented as computer programs in the base station and user equipment according to an embodiment of the invention. The computer programs in user equipment comprise instructions for executing a computer process for channel quality signaling method between a base station and user equipment in a telecommunication system, where the base station and user equipment communicate with each other using a set of given resources, the process comprising: storing connection information comprising the resources to which the channel quality signaling relates, the user equipment capability, and reference information regarding transmission power used by the base station, storing determined connection quality criteria, measuring a parameter relating to the quality of the received signal from a signal received from a base station, and determining an identification of physical connection parameters with which the connection quality criteria may be fulfilled given the determined connection information, and transmitting the determined identification to the base station.

The computer programs may be stored on a computer program distribution medium readable by a computer or a processor. The computer program medium may be, for example but not limited to, an electric, magnetic, optical, infrared or semiconductor system, device or transmission medium. The computer program medium may include at least one of the following media: a computer readable medium, a program storage medium, a record medium, a computer readable memory, a random access memory, an erasable programmable read-only memory, a computer readable software distribution package, a computer readable signal, a computer readable telecommunications signal, computer readable printed matter, and a computer readable compressed software package.

Even though the invention has been described above with reference to an example according to the accompanying drawings, it is clear that the invention is not restricted thereto but it can be modified in several ways within the scope of the appended claims.

The invention claimed is:

1. A method, comprising:
    storing determined connection information in a base station or a user equipment, the determined connection information comprising resources to which channel quality signaling relates, user equipment capability, and reference information regarding transmission power used by the base station in communication with the user equipment,
    storing connection quality criteria in the base station or the user equipment,
    measuring, in the user equipment, from the signal received from the base station, a parameter relating to the quality of the received signal, determining, in the user equipment, an identification of physical connection parameters that fulfill the connection quality criteria given the determined connection information, and transmitting by the user equipment the determined identification of physical connection parameters to the base station.

2. A method, comprising:

storing determined connection information in a base station or a user equipment, the determined connection information comprising resources to which channel quality signaling relates, user equipment capability, and reference information regarding transmission power used by the base station in communication with the user equipment, storing connection quality criteria in the base station or the user equipment, measuring, in the user equipment, from the signal received from the base station, a parameter relating to the quality of the received signal, dividing the available resource blocks into groups on the basis of measured parameter relating to the quality of the received signal, validating the parameter measurement by utilizing the determined connection quality criteria, determining, in the user equipment, an identification of physical connection parameters that fulfill the connection quality criteria given the determined connection information, and transmitting by the user equipment the determined identification of physical connection parameters to the base station.

3. The method of claim 1, wherein the connection information is determined in the beginning of a communication session between a base station and user equipment.

4. The method of claim 1, wherein the connection quality criteria is determined prior to a communication session between the base station and the user equipment.

5. The method of claim 1, wherein the connection quality criteria is signaled between the base station and user equipment during a communication session between the base station and the user equipment.

6. The method of claim 1, further comprising:

selecting, at the base station, physical connection parameters to be used by the base station when transmitting a signal to the user equipment on the basis of information transmitted by the user equipment.

7. The method of claim 1, wherein connection quality criteria comprises a measure of a quality of the connection between the base station and the user equipment.

8. The method of claim 1, wherein the connection information comprises at least one of the following:

pilot signal pattern assigned to the connection, maximum bandwidth supported by the user equipment, modulation methods and parameters supported by the user equipment, puncturing methodology to use associated with forward error correction, or power offset between a pilot signal and a data signal transmitted by the base station.

9. The method of claim 1, further comprising:

dividing the available resources into groups on the basis of measured parameter relating to the quality of the received signal and utilizing groups when determining the identification of physical connection parameters.

10. A system, comprising:

at least one base station;

one or more user equipment, wherein the base station and the user equipment are configured to communicate with each other using a set of given resources;

a network element configured to determine connection information comprising the resources to which the channel quality signaling relates, the user equipment capability, and reference information regarding transmission power used by the base station, a network element configured to determine connection quality criteria, wherein the user equipment is configured to measure a parameter relating to the quality of the received signal from a signal received from a base station, determine an identification of physical connection parameters that fulfill the connection quality criteria given the determined connection information, and transmit the determined identification of physical connection parameters to the base station.

11. The system of claim 10, wherein the user equipment of the telecommunication system comprise a memory configured to store the determined connection information comprising the resources to which the channel quality signaling relates, the user equipment capability, and reference information regarding transmission power used by the base station and a memory configured to store the determined connection quality criteria.

12. The system of claim 10, wherein the base station of the telecommunication system is configured to store the determined connection information comprising the resources to which the channel quality signaling relates, the user equipment capability, and reference information regarding transmission power used by the base station and the determined connection quality criteria.

13. The system of claim 10, wherein the base station is configured to determine the connection quality criteria and transmit the determined connection quality criteria to the user equipment.

14. The system of claim 10, wherein the base station is configured to transmit the determined connection quality criteria to the user equipment.

15. The system of claim 10, wherein the user equipment is configured to determine the connection quality criteria and transmit the determined connection quality criteria to the base station.

16. The system of claim 10, wherein the base station is configured to select physical connection parameters to be used by the base station when transmitting a signal to the user equipment on the basis of information transmitted by the user equipment.

17. The system of claim 10, wherein the user equipment is configured to divide the available resources into groups on the basis of measured parameter relating to the quality of the received signal and validate the parameter measurement by utilizing the determined connection quality.

18. User equipment of a telecommunication system, the user equipment comprising:

a transceiver configured to be in communication with a base station of the telecommunication system using a set of given resources, a memory for storing determined connection information comprising the resources to which the channel quality signaling relates, the user equipment capability, and reference information regarding transmission power used by the base station, a memory for storing determined connection quality criteria, measuring unit configured to measure a parameter relating to the quality of the received signal from a signal received from a base station, a controller configured to determine an identification of physical connection parameters that fulfill the connection quality criteria given the determined connection information, and transmit using the transceiver the determined identification of physical connection parameters to the base station.

19. The user equipment of claim 18, configured to divide the available resources into groups on the basis of measured parameter relating to the quality of the received signal and validate the parameter measurement by utilizing the determined connection quality.

20. A non-transitory computer program medium readable by a computer and encoding a computer program of instructions to execute a computer process, the process comprising:

storing determined connection information in a base station or a user equipment, the determined connection information comprising resources to which channel quality signaling relates, user equipment capability, and reference information regarding transmission power used by a base station in communication with the user equipment, storing determined connection quality criteria, measuring a parameter relating to the quality of the received signal from a signal received from a base station, determining an identification of physical connection parameters that fulfill the connection quality criteria given the determined connection information, and transmitting the determined identification of physical connection parameters to the base station.

* * * * *

UNITED STATES PATENT AND TRADEMARK OFFICE
CERTIFICATE OF CORRECTION

| | | |
|---|---|---|
| PATENT NO. | : 7,826,851 B2 | Page 1 of 1 |
| APPLICATION NO. | : 11/717704 | |
| DATED | : November 2, 2010 | |
| INVENTOR(S) | : Troels Kolding et al. | |

It is certified that error appears in the above-identified patent and that said Letters Patent is hereby corrected as shown below:

Column 10:

Lines 7 and 8 "resources to which the channel quality" should read --resources to which a channel quality--; and Line 64 "resources to which the channel quality" should read --resources to which a channel quality--.

Signed and Sealed this
First Day of January, 2013

David J. Kappos
*Director of the United States Patent and Trademark Office*